Figure 5:
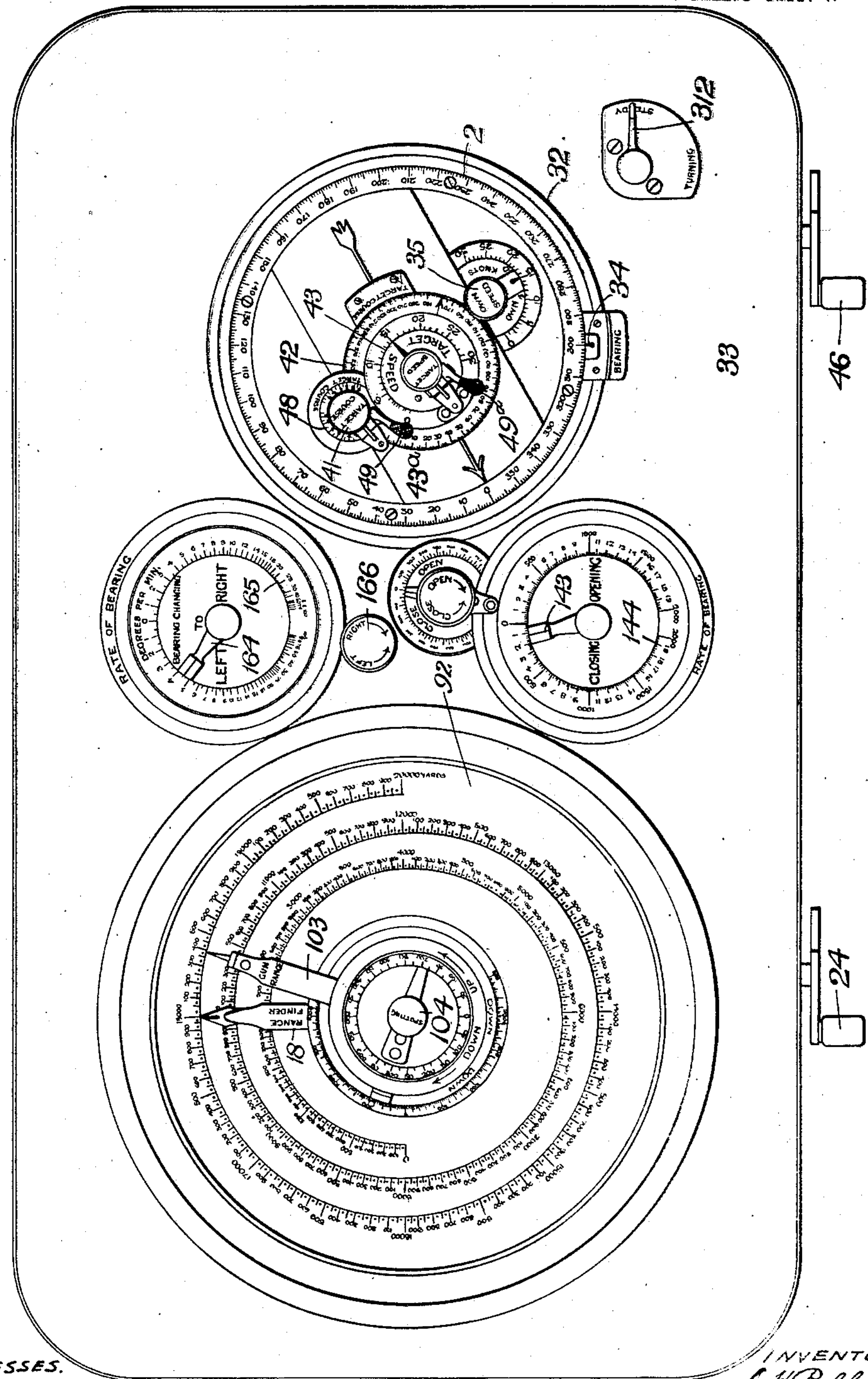

A. H. POLLEN & H. ISHERWOOD.
RANGE CLOCK.
APPLICATION FILED SEPT. 5, 1913.
1,162,510. Patented Nov. 30, 1915.
5 SHEETS—SHEET 1.
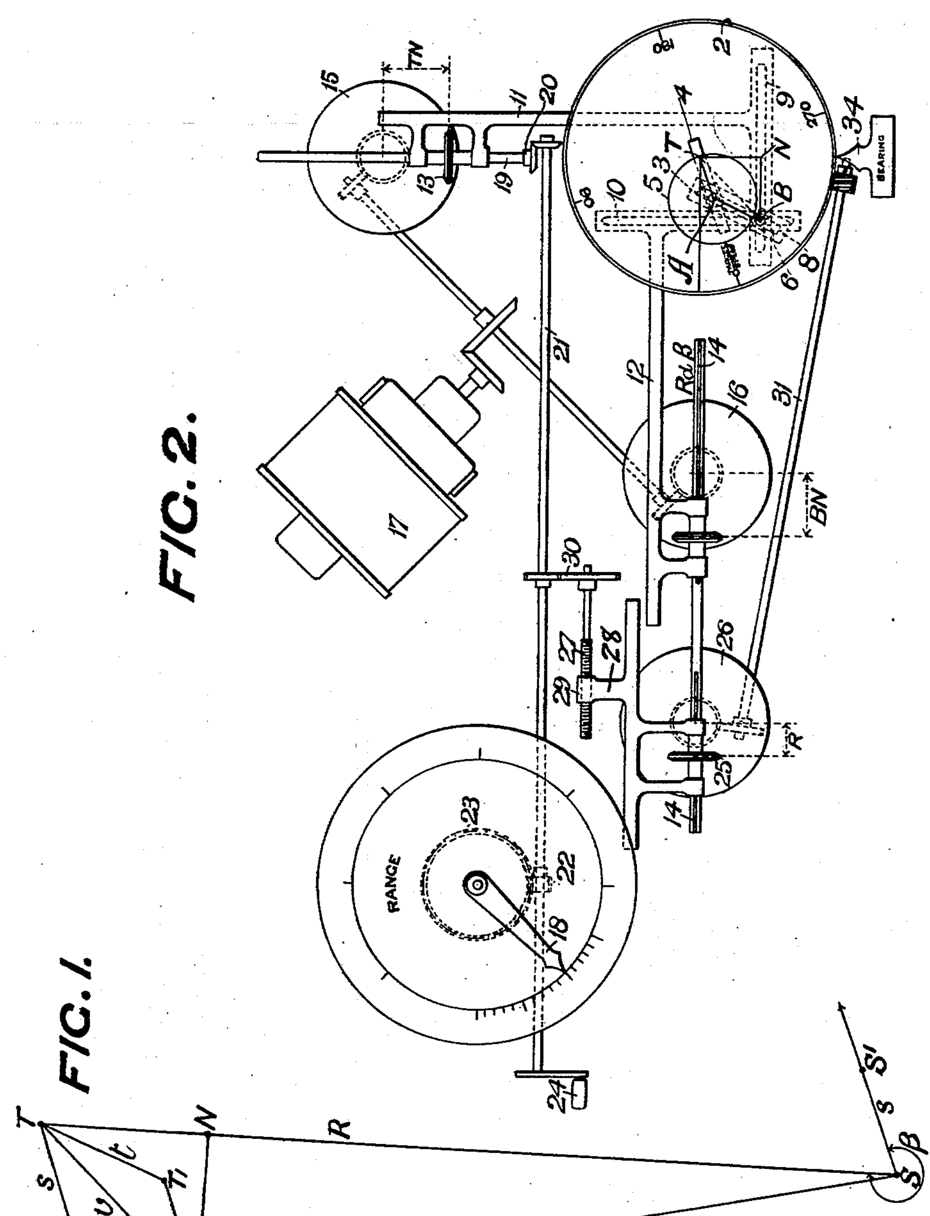
WITNESSES.
M. R. Manning
E. P. Bernhardt
INVENTORS.
A. H. Pollen
Harold Isherwood
By Rogers, Kennedy & Campbell ATTYS.

A. H. POLLEN & H. ISHERWOOD.
RANGE CLOCK.
APPLICATION FILED SEPT. 5, 1913.
1,162,510. Patented Nov. 30, 1915.
5 SHEETS—SHEET 2.
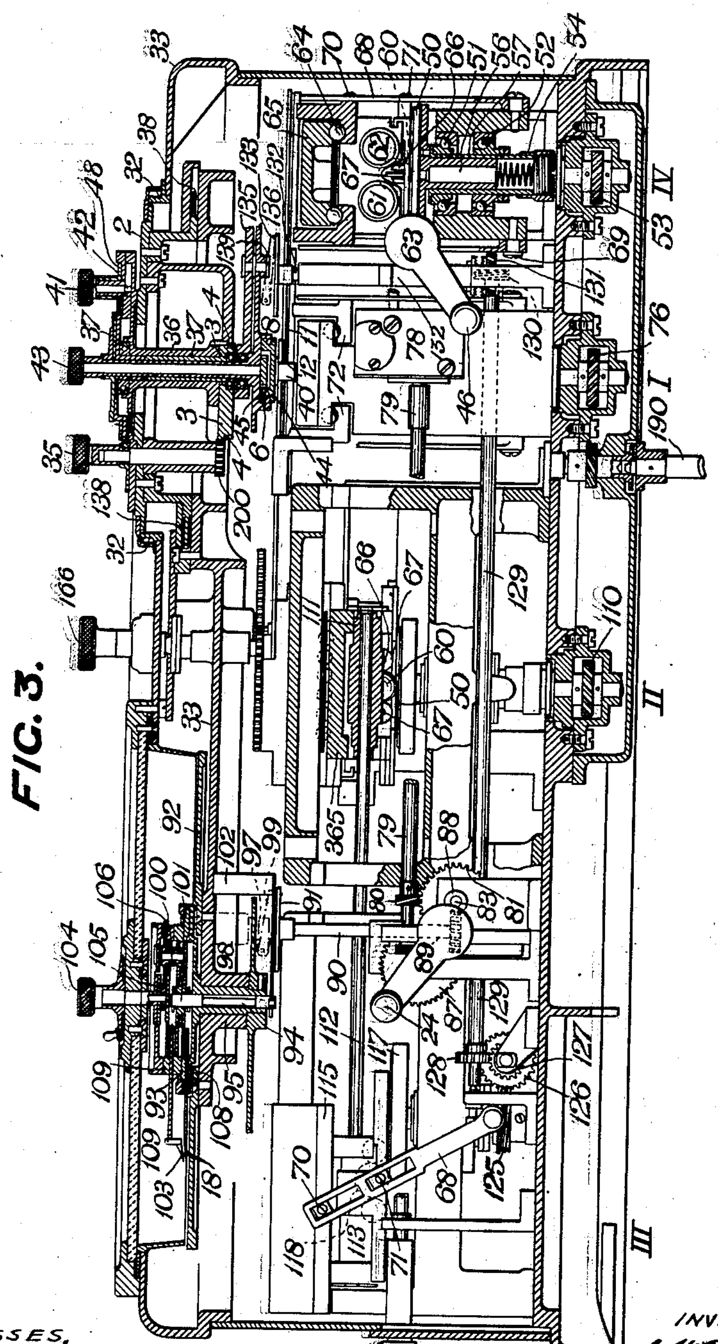
WITNESSES.
M. R. Manning
E. P. Bernhardt
INVENTORS.
A. H. Pollen
Harold Isherwood
By Rogers, Kennedy & Campbell ATTYS.

A. H. POLLEN & H. ISHERWOOD.
RANGE CLOCK.
APPLICATION FILED SEPT. 5, 1913.
1,162,510. Patented Nov. 30, 1915.
5 SHEETS—SHEET 3.
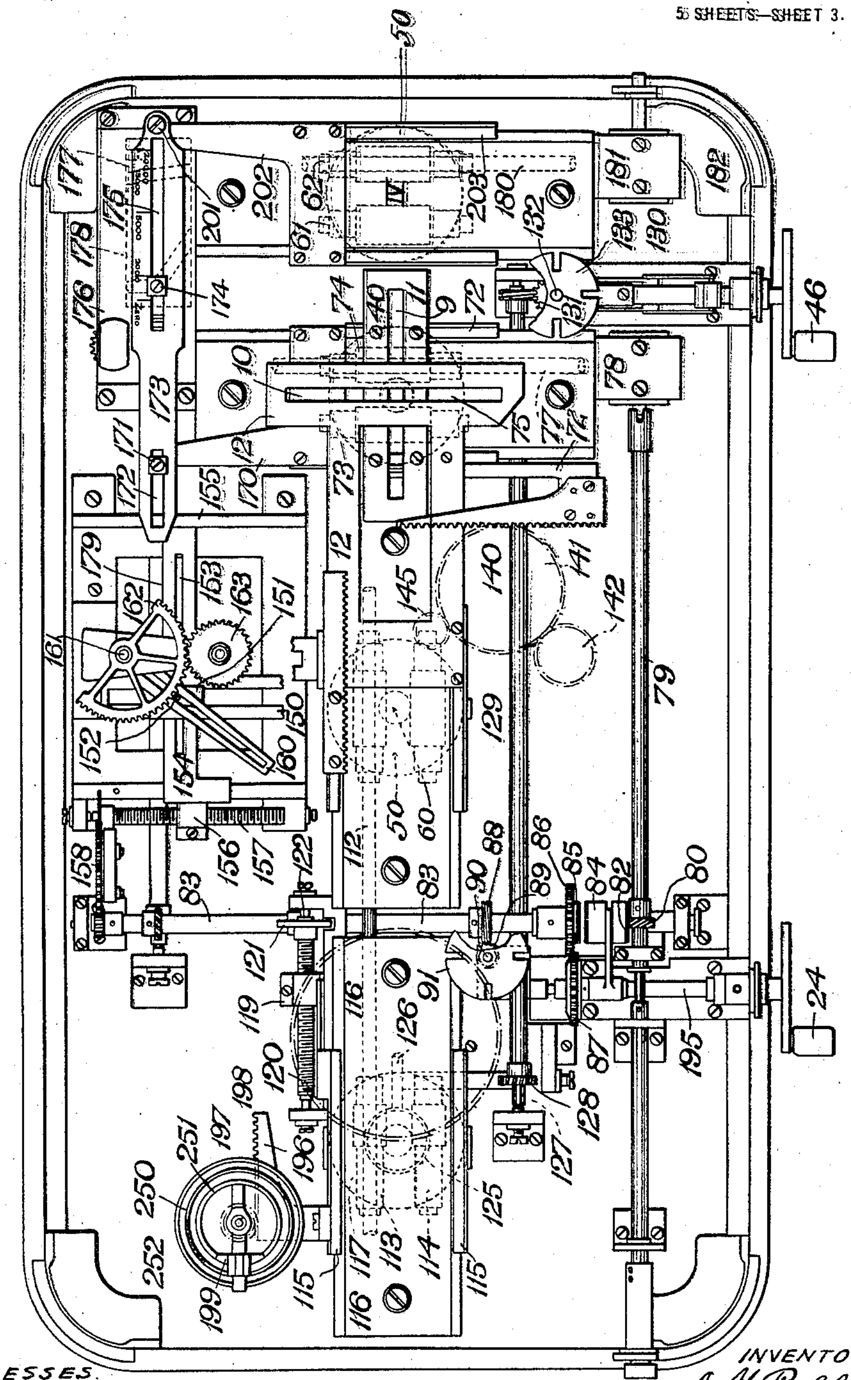
WITNESSES.
N. R. Manning
E. P. Bernhardt
INVENTORS.
A. H. Pollen
Harold Isherwood
BY
Rogers, Kennedy & Campbell ATTYS.

WITNESSES.
M. R. Manning
O. P. Bernhardt

INVENTORS
A. H. Pollen
Harold Isherwood
By Rogers, Kennedy & Campbell ATTYS.

A. H. POLLEN & H. ISHERWOOD.
RANGE CLOCK.
APPLICATION FILED SEPT. 5, 1913.
1,162,510.
Patented Nov. 30, 1915.
5 SHEETS—SHEET 5.
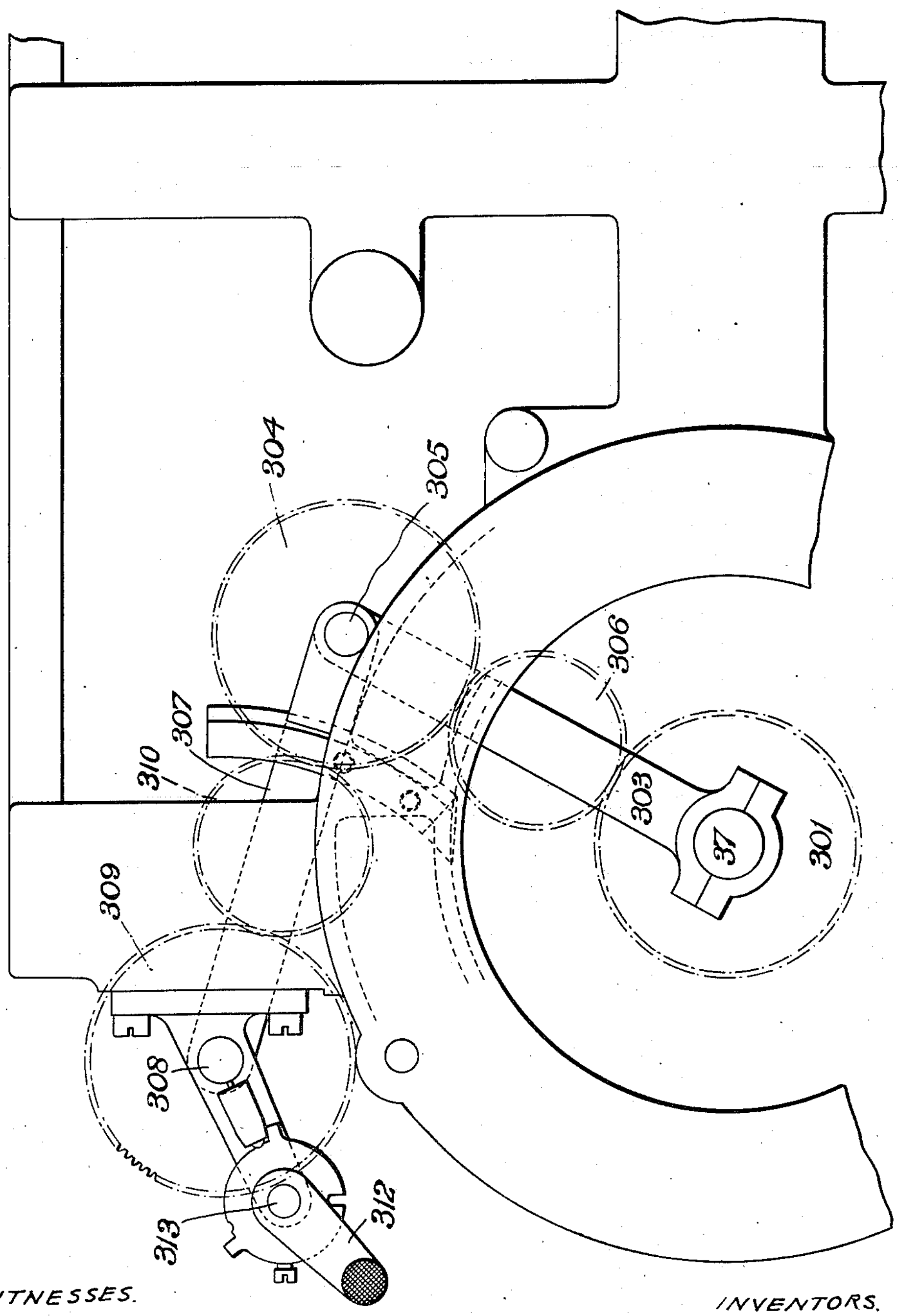
WITNESSES.
M. R. Manning
E. P. Bernhardt
INVENTORS.
A. H. Pollen
Harold Isherwood
By
Rogers, Kennedy & Campbell ATTYS

UNITED STATES PATENT OFFICE.

ARTHUR H. POLLEN, OF LONDON, AND HAROLD ISHERWOOD, OF YORK, ENGLAND.

RANGE-CLOCK.

1,162,510. Specification of Letters Patent. Patented Nov. 30, 1915.

Application filed September 5, 1913. Serial No. 788,266.

*To all whom it may concern:*

Be it known that we, ARTHUR HUNGERFORD POLLEN and HAROLD ISHERWOOD, subjects of the King of Great Britain, residing at 14 Buckingham street, Strand, London, England, and Bishophill House, York, England, respectively, have invented certain new and useful Improvements in Range-Clocks, of which the following is a specification.

This invention relates to improvements in range clocks for use at sea whereby the range of the target is indicated on a dial or its equivalent in a continuous manner although the observations of the target obtained at the rangefinder may be intermittent observations.

We are aware that an apparatus has been in use for many years for indicating the instantaneous rate at which the range is altering. Such apparatus consists of a linkage one member of which represents the vector ship's course and speed, and a second member pivoted at the extremity of the first vector represents the vector target course and speed. The resultant vector represents relative target course and speed. In such apparatus, the projection of such resultant vector on the line of sight (which is always kept alined by the operator on the target) represents the instantaneous rate of change of range, and a projection on a line perpendicular to the line of sight represents the knots deflection to a certain scale.

In conjunction with the above apparatus, it is usual to employ a clock driven mechanism of a variable speed type for indicating the range and whose speed can be manually varied in accordance with the indications of the rate of change of range obtained from the above apparatus so that the indicating mechanism continues to indicate the ranges resulting from such rates. We are also aware that suggestions have from time to time been made for eliminating the manual operation in the machine just described by mechanically transferring the rate from the said apparatus to the said indicating mechanism. Moreover, a device for combining the functions of the two instruments in one machine has already been described.

The apparatus constructed according to the herein disclosed embodiment of this invention comprises a dial the scale of which is graduated in yards of range. A pointer, called the range hand, is caused by the mechanism of the apparatus to move over the scale at a rate corresponding to the rate of change of range, when the requisite data have been set up in the instruments. Means are provided for setting the range and bearing (as determined by the range finder) and the ship's speed, and means are provided for setting up either the target course and target speed or the rate of change of range and rate of change of bearing. In order to determine the target course and target speed, recourse must be had to one of the methods of plotting. If the information is to be set up as rate of change of range and rate of change of bearing, it is no longer necessary to have recourse to a system of plotting. For instance, on board ship in which the range finder is actuated by a continuously running motor that operates through a pair of variable speed mechanisms in which the cut is maintained, both as regards range and bearing, by means of a range handle and bearing handle which control the speed, and at which control the adjustments for keeping the cut are maintained,—the rate of change of range is given directly from the position of the bearing handle. In such a case it is only necessary to transmit these positions either automatically to the range clock or to the operator in order to provide all the information required. In case where the ship is not fitted with a range finder of the kind referred to above, the two rates can be found by a system of rate plotting or in any other suitable way. We have devised means whereby the clock automatically indicates the actual bearing as well as the actual range at each instant of time, and means are also provided for rapidly and easily correcting the indications given by the clock whenever a fresh range and bearing is sent down from the range finder.

In order that the invention may be clearly understood, we proceed to describe the same with reference to the accompanying drawings in which:

Figure 1 is a diagram illustrating the relative positions of the ship and target at the beginning and end of a short interval of time which may be expressed as $dT$. Fig. 2 is a diagrammatic view showing in outlines the structure embodying the principles employed for carrying out the invention. Fig.

3 is a longitudinal vertical section of the complete clock with the cover in position. Fig. 4 is a plan of the clock with the cover (and the mechanism supported therein) removed. Fig. 5 is a plan view of the cover of the clock showing the various dials and setting heads. Fig. 6 shows the mechanism for keeping certain portions of the clock in their proper positions when a turn is being executed.

The principle on which the range clock is based will now be described.

Referring to Fig. 1, S represents the position of the ship and T that of the target at a certain instant of time. $S_1$ and $T_1$ represent the positions after a short interval of time, $d$T. Then $Ss_1=S$ which represents the course and speed of the ship, and $TT_1=t$ which represents the course and speed of the target. We can reduce the ship to rest and find the new position of the target relative to the ship by supposing that the target has moved with a velocity compounded of its own velocity $t$ together with a reversed velocity $s$ equal to that of the ship. Draw TA equal and opposite to $SS_1$ and complete the parallelogram $ATT_1$ in the point B. Then B is the new position of the target relative to the ship supposed to be at rest. The original range R is represented by ST, and the new range R+$d$R is represented by SB. It will be noticed that in the particular instance shown the range is closing and, therefore, $d$R is negative. The original bearing β is the exterior angle $S_1ST$ and is represented by about 290°. The new bearing β+$d$β is the angle $S_1SB$. It will be noticed that the bearing angle is getting smaller. Now drop a perpendicular BN on the line ST. In the limit when the time period $d$T is taken very small, the magnitudes S B S T are very great compared with the dimensions of the triangle TBN. Consequently, the rate of change of range $d$R in the interval is represented by TN, and the rate of change of bearing $d$β is represented in circular measure by the fraction $$\frac{BN}{SB},$$

that is by $$\frac{BN}{R}.$$

We, therefore, have the rate of change of range as represented by TN and the rate of change of bearing as represented by $$\frac{BN}{R}.$$

In other words, BN is a perpendicular on the line ST. Assuming, now, that the ship is reduced to rest and the time elapsing between the successive positions to be one minute: At the beginning of the minute, the target will appear to be at T and at the end of the minute will appear to be at B. The sighting and range finding operations will have been done when the ship was at T. Therefore, since the change in position in one minute is small compared to the range, the alteration in range in the minute is obtained by forming the projection SN of the new range SB on the old range ST; the difference in range is SN−ST or TN.

$$\frac{BN}{SB}$$

represents the circular measure of the angle TSB, and this angle represents the change of bearing in the interval. It will now be clear that $$\frac{BN}{SB}$$

is, on these assumptions, equal to $$\frac{BN}{ST}=\frac{BN}{R}$$

where R is the range because the difference between ST and SB is negligible compared to either of these quantities. It has now been shown that $$\frac{BN}{R}=d\beta,$$

the change of bearing; therefore, BN=R$d$β. This displacement BN=R$d$β is set up on a variable speed gear (presently to be described) so that the resultant velocity is proportional to R$d$β and drives a second variable speed gear (also presently to be described) which reduces the velocity in the ratio $$\frac{I}{R},$$

or divides the velocity R$d$β by R, giving a velocity $d$β. If a dial is furnished which is initially set to bearing B and then driven at the rate $d$β, the bearing will continue to be correctly indicated.

We now proceed to describe in general outline the methods adopted for displacing the members of the range and bearing variable speed mechanism by amounts representing the rate of change of range and rate of change of bearing, respectively.

Referring now to Fig. 2—which shows diagrammatically the arrangements for carrying out the above objects and which, with a minimum amount of mechanism, shows how the required motion is transmitted to the range hand and bearing dials, and which exactly corresponds in principle to the machine shown in the other figures of the drawings, 2 is the bearing dial arranged on the top of the instrument and graduated in degrees of bearing which read against a stationary pointer 34. It will be seen that the bearing indicated is about 290° which corresponds with the positions of ship and target represented in Fig. 1. The bearing dial is centered at the point T and carries beneath it a radial way 4 in which can slide a block 3. The radial way 4 is arranged on the radius coinciding with the zero graduation of the bearing dial. The radial way 4 carries a sliding block 3 on which is mounted a vertical axis A. The axis A carries radial ways 6 in which can slide the member 8. The member 8 carries a pin B, the whole being arranged so that the pin B can be shifted radially in the ways 6 which are rotatable about the axis A.

If Figs. 1 and 2 are compared, it will be seen that T in Fig. 2 represents the position of the target, the point S representing the ship lying somewhere outside the figure in the line joining T to the fixed bearing pointer 34. Always referring to Fig. 2 but comparing it at the same time with Fig. 1, it will be noted that the exterior angle STA represents the bearing $\beta$ and the length TA represents the speed of the ship, so that by rotating the bearing dial through the angle $\beta$ and sliding block 3 in the ways 4 through a distance representing the ship's speed, the axis A will have been displaced to a position corresponding to that shown in Fig. 1. Thus, TA is a vector representing the reversed ship's course and speed whose angular position is determined with regard to the fixed line ST. If the ways 6 are now rotated so as to be parallel to the target course and the sliding member 8 carrying the pin B is displaced along such ways by an amount representing the target speed, AB is then a vector representing target course and speed and we shall have succeeded in positioning the pin B and pin B will have been positioned so that it corresponds to the position B in Fig. 1. TB is consequently the resultant of TA and AB, and is a vector which represents the relative course and speed of the target. These means, therefore, may be said to constitute a "vector reproducing means" and are actuatable to produce a representation of the relative course and speed of the ship.

In Fig. 2 drop a perpendicular BN on the line ST passing through the fixed bearing pointer 34. Comparing again Fig. 1, the distance TN represents the rate of change of range $dR$, whereas the distance $$\frac{BN}{R}$$

represents the rate of change of bearing, that is, BN itself represents the rate of change of bearing multiplied by R or is equal to $Rd\beta$. In order to convert these lengths into actual motions of members of the machine, we provide a sliding member 11 adapted to slide parallel to the line ST and provided with a slot 9 arranged at right angles to its direction of sliding. The pin is arranged to engage in such slot. Consequently, the displacement of the member 11 represents in magnitude and direction the rate of change of range $dR$. Similarly, a member 12 is arranged to slide in a direction perpendicular to the line ST and carries a slot 10 at right angles to its direction of sliding. The pin B likewise engages in this slot so that the displacement of 12 is always equal to BN and, therefore, represents in magnitude and direction the quantity $Rd\beta$, that is R times the rate of change of bearing. The sliding member 11 controls a disk 13 mounted so that it can slide but not rotate on the shaft 19. A disk 15, mounted about a center immediately beneath a point on the shaft 19, is driven at a constant speed by any suitable means which are represented diagrammatically by the motor 17. The disk 15 is held upward in frictional contact with the disk 13, as is well understood. It follows from this construction that the speed of rotation of shaft 19 is proportional to the displacement of the disk 13 away from the center of the disk 15; that is, the shaft 19 rotates at a velocity representing the rate of change of range. The shaft 19 transmits its motion to a range hand 18 through mechanism indicated diagrammatically as bevel wheels 20, shaft 21 and skew gears 22, 23. The handle 24, when pushed inward, disconnects shafts 21 and 19, and itself engages with the gear 22 so that on pressing the handle inward the range hand can be set to any desired range; but, when the handle is released, the range hand will be driven at such a speed that it will continue to indicate the true range at future instants of time.

We have already described how a displacement is communicated to the sliding member 12 whose magnitude is represented by $Rd\beta$. The sliding member 12 controls a variable speed mechanism consisting of a disk 16 driven at a constant speed and driving the shaft 14 through a disk whose position, as before, is controlled by the sliding member 12. The shaft 14 therefore rotates at a speed represented by $Rd\beta$. The shaft 14 has mounted upon it a second disk 25, so that the disk can slide but not rotate on said shaft. A disk 26 is arranged so that it is driven by the disk 25. The position of the disk 25 relative to the disk 26 can be varied by sliding the disk 25 on the shaft 14 and such position is controlled by means of a frame 28 carrying a nut 29 which embraces a screw 27 driven through the gears 30 from the shaft 21. The rotation of the screw 27 is, therefore, proportional to the range at the moment indicated by the range hand and, therefore, the displacement of the driving disk 25 away from the center of the driven disk 26 is proportional to the range. Since the driving disk 25 rotates with a velocity $Rd\beta$, the driven disk 26 will rotate with a velocity $$\frac{Rd\beta}{R}$$

or with a velocity $d\beta$ and consequently the disk 26 is geared by skew gearing and the intermediate shaft 31 with the bearing dial 2, thus causing the bearing dial 2, when once set to the correct bearing, to continue to indicate the true bearing at future instants of time. A handle similar to the handle 24 is provided for setting the bearing dial but which is not shown in Fig. 2. When pressed inwardly it disconnects the drive between disk 26 and the bearing dial and itself engages so that the bearing at any moment may be set up on the dial.

We have now described in general terms the means adopted for causing the range hand to continue to indicate the correct range, and the bearing dial to continue to indicate the correct bearing at future instants of time.

We now proceed to describe in detail the actual construction of the machine:

Referring to Fig. 3—which is a vertical section through the center of the machine—2 represents the bearing dial graduated in degrees of bearing and mounted in the ring 32 screwed to the top of the casing 33. The graduations read against the pointer 34 shown in Fig. 5 which is a plan view of the top of the machine. The bearing dial carries beneath it a slide or way 4 in which slides the block 3. The rotation of the bearing dial as a whole carries the slide 4 around the center of the bearing dial, and the block 3 can be displaced radially along such slide or way by means of a knurled head 35 acting through the pinion 200 on a rack cut in the block 3. The knurled head 35 is employed to set the ship's speed on the machine. The block 3 carries the vertical tubular member 36 which corresponds with the axis A referred to above with reference to Fig. 2. The member 36 carries a concentrically mounted tubular member 37 on which are mounted the radial ways 6. In the ways 6 slides the member 8 carrying the pin 40 which corresponds with the pin B referred to above with reference to Fig. 2. It will be seen that the block 3 can be shifted radially in the bearing dial by the knurled head 35 to set up ship's speed. The ways 6 can be rotated by means of the knurled head 41 and gears 42 to set up target course and the block 8 carrying the pin 40 can be shifted radially in the ways 6 by means of the knurled head 43 operating through the pinion 44 and rack 45.

Referring to Fig. 5, the initial bearing is set up (in a manner to be described later) by the handle 46 which rotates the bearing dial as a whole, carrying the various knurled heads and scales shown in Fig. 5. Said ship's speed is set up by rotating the head 35 (marked "Own speed"), the effect being to shift the target course head 41 and its dial, and the target speed head 43 and its dial in the direction of the large arrow, Fig. 5. The target course head 41 rotates the target course dial 48 together with the target speed head and dial. Clamps 49 and 49$^a$ are provided for fixing the position of the target course head and target speed head, if desired.

We have now described how, when range, bearing, ship's speed, target-course and target-speed have been set up, there results a definite position of the pin 40. As has already been described, the position of the pin 40 enables us to obtain a measure of the rate of change of range and the rate of change of bearing, and in order to convert this position into movements of portions of the mechanism occurring at the corresponding speeds, we employ a special form of variable speed mechanism which it will now be convenient to describe: Referring to Fig. 3, one such variable speed mechanism marked IV is shown at the extreme right hand end. The mechanism consists essentially of a horizontal disk 50 rotating at a constant speed about a vertical axis. The disk is carried on the cylindrical piece 56 sliding in the sleeve 57 which is mounted in ball bearings 51, 52 and is driven from the skew gear 53. The disk as a whole is forced upward by the spring 54 acting to press the cylindrical piece 56 upward within the sleeve 57. Above the disk 50, which is made of hard steel, is mounted a hard steel ball 60 which lies in contact with and between two rollers 61, 62 mounted in the frame 63. The frame 63 is capable of sliding as a whole in the direction perpendicular to the plane of the paper on balls 64 mounted in a race cut in the piece 65 which is fixed to the frame of the machine. The spring 54 presses the ball 60 upward against the rollers 61, 62, and maintains the frame 63 in contact with the balls 64. In general, the disk 50 is driven at a constant speed and communicates a variable speed to the ball 60 which, in turn, communicates its speed of rotation to the rollers 61, 62. In order to cause displacement of the balls 60 radially on the disk 50, the frame 63 carrying the rollers 61, 62, is shifted perpendicularly to the plane of the paper. In this way, the position of the ball on the disk is determined by the position of the sliding frame 63 which, when it moves through a given distance horizontally, rolls the ball along a diameter of the disk through a distance approximately equal to half the travel of the sliding frame. In order, however, to insure that the ball shall remain in its correct position, it is embraced by a fork 66 carrying rollers 67 arranged to move parallel to the sliding frame and driven thereby at the proper speed by means of the lever 68 pivoted about the fixed center 69 and provided with a slot in which a pin 70 carried by the sliding frame 63 and a pin 71 carried by the fork 66 engage. In general, a constant speed is communicated to the disk, and a variable speed is taken out from the rollers, but in one case in the machine (hereinafter referred to) this disposition is reversed, and the rollers drive the disk. When the ball is in the center of its travel and coincides with the center of the disk, no rotation will be given to the rollers; but, if the ball is displaced from such central position by a displacement of the sliding frame, the rollers will rotate at a speed directly proportioned to the magnitude and direction of the displacement of the sliding frame from its central position.

The advantage of this construction of variable speed mechanism is that owing to the changes in the ball's position being produced by a rolling motion, the ball does not slip or fail to drive the rollers at the moment when its position is being changed. This was formerly a difficulty which introduced a noticeable inaccuracy in earlier forms of rollers and disk variable change speed gear.

Fig. 3 shows change speed mechanisms such as are above described in three different positions, the one on the extreme left marked III being an elevation in a plane parallel to the rollers and showing the lever 68 and the pins 70, 71 engaging with the slot therein. The change speed gear in the middle of the figure marked II is shown in a plane passing through the center of one of the rollers, and clearly shows the ball 60 resting on the disk 50 and lying between the rollers 67 carried by the fork 66.

We now proceed to describe the means by which the position of the pin 40 is utilized to determine the speed at which the range hand 18 and the bearing dial 2 are driven. The pin 40 depends from the slide 8 and engages in a slot 9 formed in a plate 11 as shown in plan in Fig. 4 and in sectional elevation in Fig. 3. The plate 11 is carried on the sliding frame 72 seen best in Fig. 4. The sliding frame 72, carries rollers 73, 74, (shown dotted in Fig. 4) mounted similarly to the rollers 61, 62, already described, above, on a disk 75 driven at a constant speed from the skew gear 76 shown in Fig. 3. The displacement of the pin 40 (see Fig. 4) displaces the plate 11 and frame 72, rollers 73, 74, and the corresponding ball, along a diameter of the disk 75 by an amount proportional to $dR$, and such displacement results in a speed of rotation of the rollers 73, 74, which is proportional to $dR$, or to the rate of change of range. The roller 74 is mounted so that it can slide but not rotate on the shaft 77 which transmits its motion through a skew or worm gear contained in the box 78 to the shaft 79 shown broken in Fig. 3 but unbroken in Fig. 4.

Referring to Fig. 4, it will be seen that the shaft 79 carries a skew gear 80 which meshes with the skew gear 81 and claw clutch 82 loose on the shaft 83. The shaft 83 carries a corresponding claw clutch 84 which can slide but not rotate on the shaft 83. The shaft 83 also carries the claw clutch 85 which is loose thereon and carries the spur wheel 86 which meshes with the spur wheel 87 carried on the shaft 195 on which is mounted the handle 24. Motion can only be transmitted to the shaft 83 by rotating the sliding portion 84 of the clutch mechanism. The sliding portion 84 is arranged to run solid with either the skew gear 81 or the spur wheel 86 according as the handle 24 remains outward or is pressed inward. In the position shown in Fig. 4 the sliding piece 84 runs solid with the skew gear 81 and therefore motion is transmitted to the shaft 83 from the shaft 79, that is to say the shaft 83 is being driven at a rate proportional to the rate of change of range. The shaft 83 carries a worm 88 meshing with a worm wheel 89 on the vertical shaft 90 which carries at its upper extremity the dog clutch 91.

Referring now to Fig. 3, the upper part or lid of the machine 33 which carries (as already described) the bearing dial 2 and its attendant mechanism, also carries the range dial 92 over which travels the range hand 18. The range hand is mounted in a box 93 carried by the hollow spindle 94 mounted in the bearing 95 fixed in the lid of the machine. The hollow spindle 94 carries a spur wheel (not shown) and which meshes with a smaller spur wheel 97 carried in the fixed bearing 98 and provided with a latch 99. When the lid is in place, the spur wheel 97 comes exactly over and lines up with the vertical shaft 90, and the latch 99 engages with the dog clutch 91; thus, the motion of the vertical shaft 90 is transmitted to the box 95 which carries the range hand 18. In order to provide a more open scale for the range dial, the graduations are arranged on a spiral as shown in Fig. 5 and means are provided whereby as the range hand 18 is carried around, it is caused to move radially outward or inward. This is accomplished by means of a rack cut on the range hand which meshes with a fixed pinion 100 supported from below by the plate 101 carried by the lug 102. A subsidiary hand 103 is arranged, called the "gun range hand," and is mounted in a box 109 mounted rotatably in the box 93 and is capable of rotation relatively to the box 93 and therefore relatively to the range hand by means of the knurled head 104 acting through the spur gears 105, 106, 107, 108. A rack cut on this hand also meshes with the fixed pinion 100 so as to cause its point to follow the spiral, as already described with reference to the range hand. The hand 18, bearing the words "range-finder," is set to the range obtained from the range-finder, while the other hand 103 (engraved with the words "Gun range") can be displaced from coincident with the hand 18 through the medium of the knurled head 104, so that it will indicate the range which has to be set up in the gun-sights. The gun-range will differ from the range-finder range by the sum of the corrections which must be made to the range-finder range to allow for the wind, the atmospheric conditions, temperature of charge, etc. In other words, as the range-finder range and the gun-range are invariably of different values, the two hands are provided on the clock in order that both ranges may be continuously indicated.

We have now described how, by means of the handle 24, the range can be set on the range dial, and how when the various quantities namely bearing, ship's speed, target speed, and target course, have been set up, the range hand will continue to indicate the correct range at future instants of time.

We now proceed to describe in detail the means adopted for setting the bearing on the bearing dial and for causing such dial to rotate at a speed representing the rate of change of bearing.

Referring to Fig. 4, it will be seen that the pin 40, in addition to passing through the slot 9 in the plate 11, passes through the slot 10 in the plate 12. The plate 12 carries the sliding frame 365 of a variable change speed mechanism whose disk 50 is driven at a constant speed by the skew wheel 110, thus imparting to the roller 111 and shaft 112 a speed it is proportional to the displacement of the slot 10. We have already shown that the displacement of the slot 10 is proportional to the product of the range and the rate of change of bearing, and that is proportional to $Rd\beta$ and consequently the shaft 112 rotates with a velocity $Rd\beta$. The shaft 112 carries one of the rollers 113 of a variable speed mechanism marked III and shown in elevation to the extreme left of Fig. 3 and in plan dotted in Fig. 4. As before, the rollers 113, 114 are mounted in the sliding frame 115 carried on the fixed ways 116. The motion is transmitted from the shaft 112 through the rollers 113, 114 to the disk 117. The position of the ball 118 which transmits motion from the roller 113 to the disk 117 is determined by the position of the sliding frame 115. The position of this frame is controlled by a nut 119 rigidly fixed to the frame 115 and which embraces a screw 120 driven by the skew gears 121, 122 from the shaft 83. The position of the shaft 83 and, therefore, of the frame 115 is determined by the range indicated on the range dial, and consequently the speed of the disk 117 is the speed of the shaft 112 divided by the range, that is, it is equal to $$\frac{Rd\beta}{R}$$

or is equal to $d\beta$. The motion of the disk 117 is transmitted through worm 125, worm wheel 126, worm 127, worm wheel 128, shaft 129, worm 130, worm wheel 131, shaft 132, to the dog clutch 133 arranged beneath the bearing dial. Means are provided by which the handle 46 is pressed inward, the worm 130 is disengaged from the worm wheel 131, and the handle 46 is placed in gear therewith so that, when the handle 46 is in its normal position, the dog clutch 133 is driven by the mechanism at such a rate (representing the rate of change of bearing) that when the handle 46 is pressed inward the dog clutch 133 is driven direct from the handle. When the cover 33 is in position, an axis 139 comes immediately above the shaft 132. On the axis 139 is mounted a dog 137 shown dotted which engages with the dog clutch 133. The dog 137 drives the spur wheel 138 carried on the bearing dial 2 by means of gearing not shown.

We have now described the mechanism by which the range can be set on the range dial and the bearing can be set on the bearing dial and whereby when the quantities ship's speed, target speea and target course have been set up, the true range and bearing will continue to be correctly indicated.

We now proceed to describe means whereby, the rate of change of range and rate of change of bearing that exist at any particular moment are indicated on special dials and, also, means whereby we are able to obtain the correct setting of the mechanism by setting the rate of change of range and the rate of change of bearing instead of setting the quantities, target course and target speed. It will be remembered that the displacement of the slot 9 cut in the plate 11 carried by the sliding frame 72 is proportional to the rate of change of range. For the purpose of indicating such rate, the frame 72 (see Fig. 4) carries a rack 140 meshing with a spur wheel 141 shown dotted, the spur wheel 141 meshing with the spur wheel 142 which carries the rate of range hand 143 moving over the dial 144 (see Fig. 5). The spur wheel 141 also meshes with the spur wheel 145 on the same shaft as the knurled head 146 for setting the rate of range. In order to obtain an indication of the rate of change of bearing $d\beta$, we mount on the sliding frame 12 of bearing dial 2 an arm 150 shown broken in Fig. 4 and provided with a slot in which slides a block 151. The arm 150 therefore suffers a displacement perpendicular to its length proportional to $Rd\beta$. A pin 152 carried on the block 151 engages in a slot 153 cut in the plate 154 adapted to slide in ways 155 in a direction perpendicular to its length, its position being controlled by a nut 156 embracing a screw 157 driven through gearing 158 from the shaft 83. The rotational position of the shaft 83 is proportional to the range R and, consequently, the pins 152 will be moved in one direction to an extent proportional to R and by an amount in a direction at right angles to $Rd\beta$. An arm 160 is pivoted at 161 and provided with a slot in which the pin 152 engages so that the displacement of pin 162 determines the rotation of the arm 160 about the axis 161. If $\theta$ is the angle through which the arm 160 is displaced, it is easily seen that $$\tan.\theta - \frac{Rd\beta}{R} - d\beta.$$

We therefore provide a spur wheel on the axis 161 for driving a spur wheel 163 which carries the rate of bearing hand 164 over the dial 165 graduated according to a tangent law and as shown in Fig. 5. A knurled head 166 is also provided as gearing with spur wheel 163 for setting the rate of change of bearing.

In the machine, as described above, when the ship's speed has been set by the knurled head 35 and the range and bearing have been set by the handles 24 and 46, we can either set the machine by setting the rate of range and the rate of bearing, in which case the target course and target speed will be automatically indicated on the corresponding dials 48 and $43^a$ (see Fig. 5); or we can set the machine by setting the target course and target speed, in which case the rate of range and the rate of bearing will be automatically indicated on the dials 144 and 165. In either case, the machine will continue to indicate the range and bearing correctly at future instants of time.

We now proceed to describe means by which the information as to range at any time contained in the machine can be automatically transmitted to the sights by means of the ordinary service transmitter gear (not shown). The above instrument is provided with range graduations which do not follow a straight line law, that is, the graduations are more open at one end of the scale than at the other. The service transmitter which operates the above instrument is a step-by-step mechanism and a single step does not correspond to the same change of range at different parts of the scale. It is, therefore, impossible to transmit the range to this instrument from the shaft 79 or 83 because indications if right at one part of the scale would be wrong at another part, and we accordingly employ a special variable speed mechanism marked (IV in Figs. 3 and 4) for the purpose of producing a range rate multiplied by a variable quantity depending upon the magnitude of the range at the particular instant.

It will be remembered that slot 9 in plate 11 carried by frame 72 has a motion proportional to rate of change of range $dR$. The frame 72 carries an extension 170 on which is mounted a pin 171 engaging in a slot 172 cut in the left hand end of a lever 173 pivoted on a pin 174 which engages in a long slot 175 cut in the right hand end of the said lever. The pin 174 is mounted in a slide carried on the subsidiary base plate 176, and has a projection which engages with a cam groove 177 cut in a cam or cylinder 178 mounted on a shaft (not shown) which is driven by the worm gear 180 from the shaft 83. The rotational position of the cam or cylinder 178 therefore depends on the range. The right hand end of the lever 173 embraces a pin 201 carried on an extension 202 of the sliding frame 203 of the variable speed gear IV. The position of the pin 174, about which the lever 173 rocks, is determined by the position of the cam or cylinder 178, and, consequently, the displacement of the frame 203 is equal to the displacement of the frame 72 multiplied by a certain fraction depending upon the position of the cam or cylinder 178. The disk of variable speed gear IV is driven at a constant speed through skew gear 53 and, consequently, the ball of the variable speed gear IV transmits to the roller 62 a velocity proportional to the rate of change of range multiplied by a fraction whose magnitude depends on the value of the range at the particular moment. The cam or cylinder 178 is so cut that this fraction corresponds with the distance between successive graduations on the dial of the service transmitter gear. The roller 62 transmits its motion through the shaft 180 and through gearing contained in the box 181 to a service-transmitter shaft 182 which extends outside of the casing is connected directly to the service transmitter (not shown, as aforementioned).

The power necessary to operate the disks of the variable speed mechanisms I, II, and IV is led into the machine through the vertical shaft 190 whence it is distributed to the skew wheels 76, 110 and 53 by a shaft not shown. It is necessary that the shaft 190 should rotate at a constant speed and with sufficient power, and we may employ for this purpose a special device for regulating the speed of said shaft. We may, however, regulate the speed of shaft 190 by human agency in which case the shaft is driven by an electric motor whose speed can be controlled by a suitable rheostat. A vertical pillar is then provided and so geared to the shaft 190 that it makes one revolution per minute, and we provide a clock with a center second hand which is placed on the said pillar in convenient proximity to the rheostat operating handle. We further provide a suitable fixed lubber line, and it is the duty of the individual controlling the speed to keep the second hand on the lubber line at all times by varying the position of the said handle.

In order that the mechanism may not overrun at extremely large or extremely small ranges, we provide an automatic cut off switch shown in Fig. 4 whereby the motive power which drives the clock is cut off whenever the range indicated becomes greater or less than a certain amount. It will be remembered that the position of the sliding frame 115 is determined by the range, and we accordingly mount a rack 196 on this frame which meshes with a gear wheel 197 on a vertical axis 198 that carries a brush 199 making electrical contact between the rings 250, 251. The outer ring is interrupted at 252, so that, if the brush arrives at the portion 252 the current is cut off from the machine.

In the range clock, as above described, the line joining the ship and the target is represented by a fixed line in the clock, and the target course and ship's course are set in relation to this line. If the course of the ship is changed, the bearing of the target becomes altered by the same amount, and it will accordingly be necessary to alter the target course by the same amount. Since the target course dial is mounted on the bearing dial, all that is necessary in order that the target course should be correctly indicated after the ship's turn has been completed is that the target course dial 48 (see Fig. 5) should be maintained in an invariable position in the clock during the turn, in which case the target course dial will remain fixed while its index line is carried past it by the rotation of the bearing dial by an amount equal to the ship's turn and therefore the target course will continue to be correctly indicated. We therefore provide means by which the target course dial is kept in an invariable position during the turn and is released again as soon as the turn is completed. The form of mechanism we adopt for this purpose resembles the mechanism of the ordinary drafting machine type which is employed for the purpose of permitting the draftman's square to be moved into any position on the drawing board under a constraint which compels it to remain always parallel to itself.

Referring to Fig. 6, a spur wheel 301 is carried on the axis 37 which carries the ways 6 of the target course dial. Pivoted loosely on such axis 37 is an arm 303 which carries a spur wheel 304 pivoted at 305. An idle wheel 306 also pivoted to the arm 303 engages with the wheels 301 and 304. An arm 307 is pivoted to the arm 303 at 305 and is itself pivoted to the frame of the machine at 308. A spur wheel 309 is also pivoted at 308 and an idle wheel 310 also pivoted to the arm 307 engages with the wheels 304 and 309. A handle 312 pivoted on a vertical shaft 313 is placed in a suitable position on the upper portion of the clock as shown in Fig. 5 and serves when placed in one position to lock the wheel 309 but when in another position to release the same. The aim, now, is to be able to prevent the wheel 301 from rotating at any predetermined moment. As the axis is constantly being moved about in the plane of the wheel 301, itself, we have utilized the described structure which is the well-known gear for mounting a square parallel to a given direction. Controlled by this means, the wheel 301 remains parallel to the wheel 309; and, therefore, if the wheel 309 becomes fixed, so also will the wheel 301 become fixed and be prevented from rotating.

The shaft 37 carries the target course dial, which, as described, is to be maintained in a fixed direction when a change of course is being executed by the ship. The shaft 37 is journaled in the tubular member 36 mounted upon the sliding block 3, Fig. 3. The end of the arm 303 is, therefore, not fixed in position, but is movable to a position eccentric with the bearing-dial 2 when the block 3 is moved for setting the speed of the ship. The arms 303 and 307, together with the spur gears mounted upon them, constitute a parallel-motion device, so that a visible diameter drawn on the gear 301 parallel with a similar diameter on the gear 309 would remain always parallel with the diameter on said gear 309. When the ship and the target are proceeding upon straight courses, the target-dial is set to the angle contained between the courses, and it is locked in this position by means of the clamp 49 which engages with the knurled head 41. The target-course dial and, therefore, the gear 301, and the train leading up to the gear 309, will, consequently, revolve as the bearing dial rotates for a change of bearing, and the spindle 37, and, therefore, the end of the arm 303, will describe a circular motion, the radius of which will depend upon the speed setting of the ship. In these conditions, the lever 312 is set to the position in which it leaves the gear 309 free to rotate. The train of gears which terminate in 309 and 301 are now all acting as idlers because the spindle 37 is locked to the bearing-dial and turns with it. If now the observing ship changes course, it is desirable (as already pointed out) that the target-course dial shall be maintained in its existing direction while the bearing-dial is rotated for the resulting change of bearing. The target-course dial is, therefore, unlocked with reference to the bearing-dial, and the gear 309 is locked to the frame of the machine by shifting the lever 312 to the other end of its movement. This means that the gear 301, and, therefore, the spindle 37 and the target-course dial, are all locked in the frame in regard to direction, but are free to be bodily translated within the limits of the circle whose radius is the maximum speed that can be set up for the observing ship. The gear 309 is locked to the frame of the machine when the lever 312 is in its upward position, as shown in Fig. 6. It is to be noted that all the index characters on this figure are upside down. This locking is effected by means of a spring plunger which presses upon the periphery of the wheel 309 when the lever 312 is in its upward position, but is forced downward to an inoperative position when the lever is turned downward. The shaft 37, being carried by the block 3, will be moved along a diameter of the bearing dial 2 when a speed setting for the ship is applied to the machine.

It will be seen from the above description that when the wheel 309 is locked, the wheel 301 can be displaced in any desired direction in its own plane but is incapable of rotation. It is consequently capable of following the lateral movements which may be imparted to it during the action of the clock, but when the handle 312 is in its locking position no rotation can be imparted to it. All that is necessary therefore in order to maintain the target course indication is to move the handle 312 into its locking position while the turn is being executed and to move it back into its steady position after the turn is complete.

The range and bearing clock has been described in its most complete form in which it is adapted for use in conjunction with an observing station which is itself moving. The invention however is equally applicable on land and the simplification of the apparatus which results from eliminating the mechanism for setting up the ship's speed is considerable. The necessary modifications will be apparent without further explanation.

What we claim is:—

1. A range and bearing clock for continuously generating the change of range and the rate of bearing of a relatively remote traveling object, including a range-dial graduated in yards of range; a range hand movable thereover; means for setting the range-dial; a bearing-dial graduated in degrees of bearing and juxtaposed to the range-dial; a bearing-pointer juxtaposed thereto; dial-setting means common to the range and bearing-dials for automatically operating them individually to indicate the actual bearing and the actual range at each instant of time.

2. A range and bearing clock for indicating the change of range and rate of bearing of a relatively remote traveling target-object, including a settable range-dial, a settable bearing-dial disposed in juxtaposition to the range-dial; dial-setting means interposed between and common to said dials for automatically actuating them to indicate the target-course and target-speed; and means for effecting an indication of the rate of change of range and rate of change of bearing, said means being settable at the will of the operator.

3. A range and bearing clock for continuously generating on board ship the rate of change of range and the rate of change of bearing of a relatively remote traveling object, including a settable range-dial; a settable bearing-dial; mechanism interposed between and common to the dials for automatically varying continuously the initial range and bearing set up in the clock; and means operatively connected to and deriving actuation from said varying mechanism for continually correcting the rates set up on said dials.

4. A range and bearing clock for continuously generating on board ship rates of change of range and bearing of a relatively remote traveling object, including a settable range-dial; a settable bearing-dial; and interposed means common to the range and bearing dials and operative automatically to actuate said dials, respectively, to indicate the instantaneous rate of change of range and change of bearing.

5. A range and bearing clock for continuously generating rates of change of range and bearing of a relatively remote traveling object, including a settable range-indicating instrumentality; a settable bearing-indicating instrumentality; and automatic means for effecting on said bearing instrumentality an indication of the magnitude of the rate of change of bearing comprising linkage mechanism including a plurality of coöperating displaceable instrumentalities, and means for transmitting to one of said instrumentalities the magnitude of displacement of the other of the said instrumentalities.

6. A range and bearing clock for continuously generating rates of change of range and bearing of a relatively remote traveling object, including a settable range-indicating instrumentality; a settable bearing-indicating instrumentality; automatic means for effecting on said bearing instrumentality an indication of the magnitude of the rate of change of bearing comprising linkage mechanism including a plurality of coöperating displaceable instrumentalities, means for transmitting to one of said instrumentalities the magnet of displacement of the other of the said instrumentalities, and means connecting with, and adapted to actuate, said indicating instrumentalities in accordance with such magnitude of displacement.

7. A range and bearing clock of the class specified for generating rates of change of range and bearing of a relatively-remote traveling target, including a range-indicating instrumentality; a bearing-instrumentality; an instrumentality which is displaceable according to the course and speed of an observed target; a second instrumentality cooperatively related to the displaceable instrumentality and settable in accordance with the course and speed of a ship from which observations are made; and variable speed-mechanism actuatable to speeds proportional to the components of the displacement of said displaceable instrumentality.

8. A range and bearing clock of the class described, comprising a plurality of dial-instrumentalities including a range-dial and a bearing-dial, means for automatically setting up thereon, as quantities, a ship's speed, and a target-range, bearing, course and speed, variable speed-producing mechanism operatively connected to said setting means, and means deriving motion from said mechanism for generating rate of change of range and a rate of change of bearing and target-course and target-speed, at the will of the operator.

9. A range and bearing clock of the class specified including a range-dial graduated in yards of range; means for effecting an initial setting of the dial; a bearing-dial graduated in degrees of bearing; means for effecting an initial setting of the bearing-dial; and means for automatically and continuously varying such initial range and bearing comprising a plurality of controlling members shiftable in relatively different directions, variable speed mechanism controlled by said controlling members, and operating connections between said speed mechanism and said dials for actuating them.

10. A range and bearing clock of the class specified including a range-dial graduated in yards of range; means for effecting an initial setting of the dial; a bearing-dial graduated in degrees of bearing; means for effecting an initial setting of the bearing-dial; and means for automatically and continuously varying such initial range and bearing comprising a plurality of juxtaposed controlling members shiftable in relatively different directions, a plurality of slidable elements, one of which is rotatable about an axis perpendicular to the plane of movement of said elements, a pin-carrying element carried by one of said elements and coöperating with the other, whereby displacement of said pin-carrying element represents in magnitude and direction the rate of change of range; and means for transmitting the movement of said element to one of said dials.

11. A range and bearing clock of the class specified including a range-dial graduated in yards of range; means for effecting an initial setting of the dial; a bearing-dial graduated in degrees of bearing; means for effecting an initial setting of the bearing-dial; means for automatically and continuously varying such initial range and bearing comprising a plurality of juxtaposed controlling members shiftable in relatively different directions, a plurality of slidable elements, one of which is rotatable about an axis perpendicular to the plane of movement of said elements, a pin-carrying element carried by one of said elements and coöperating with the other, whereby displacement of said pin-carrying element represents in magnitude and direction the rate of change of range; and means for transmitting the movement of said element to one of said dials, including a shaft-element whose speed of rotation represents the rate of change of range which it transmits to the range-dial.

12. A range and bearing clock of the class specified including a range-dial graduated in yards of range; means for effecting an initial setting of the dial; a bearing-dial graduated in degrees of bearing; means for effecting an initial setting of the bearing-dial; and means for automatically and continuously varying such initial range and bearing comprising a plurality of juxtaposed controlling members shiftable in relatively different directions, a plurality of element-supporting radial ways disposed in angular relation, a sliding member sustained by one of said ways, a pin-element carried thereby, and a block sliding in another of said ways; said controlling members being provided with slots, each extending in a direction at right angles to its direction of shifting movement, and into each of which slots said pin-element extends.

13. A range and bearing clock of the class specified including a range-dial graduated in yards of range; means for effecting an initial setting of the dial; a bearing-dial graduated in degrees of bearing; means for effecting an initial setting of the bearing-dial; and means for automatically and continuously varying such initial range and bearing comprising a plurality of juxtaposed controlling members shiftable in relatively different directions, a plurality of element-supporting radial ways disposed in angular relation, a sliding member sustained by one of said ways, a pin-element carried thereby, a block sliding in another of said ways; said controlling members being provided with slots, each extending in a direction at right angles to its direction of shifting movement, and into each of which slots said pin-element extends; a plurality of variable speed mechanisms acting under the control of said controlling-members; and connections between said mechanism and the dials whereby the actual bearing and the actual range is indicated thereon at each instant of time.

14. A range and bearing clock for continuously generating the change of range and the rate of change of bearing of a relatively remote traveling object, including a range-dial graduated in yards of range; a range-hand pointer movable thereover at a rate corresponding to the rate of range, and manually settable at any appropriate range; means for preliminarily setting the range-dial; a rotatable bearing-dial graduated in degrees of bearing; a relatively stationary bearing-pointer; means for preliminarily setting the bearing-dial; means interposed between the range and bearing-dials for automatically indicating the actual bearing and the actual range at each instant of time comprising a slidable block; a vertical axial instrumentality carried by said block, a radial way underlying the bearing-dial in which said block slides and arranged on a radius coinciding with the zero-graduations of the bearing-dial; a sliding member juxtaposed to the slidable block and rotatable about said vertical axial instrumentality; a radial way carried by and rotatable about said axial instrumentality and in which said sliding member is slidable; a pin carried by said sliding member and radially shiftable; a sliding disk-shifting member provided with a slot at right angles to its direction of sliding movement and in which said pin engages, whereby displacement of said disk-shifting member represents in magnitude and direction the rate of change of range; a variable speed mechanism including a disk carried by and shiftable with said disk-shifting member; a driving-disk for said shiftable disk, and a shaft on said disk and whose speed of rotation is proportional to the displacement of the disk away from the center of the driving-disk, and which velocity represents the rate of change of range and transmits motion to the range hand pointer; a constant speed motor for driving said driving-disk; connections between said shiftable disk and the range dial to actuate the same and thereby indicate the range-change; a second disk-shifting member provided with a slot at right angles to its direction of sliding and in which said pin also engages whereby displacement of said member represents in magnitude and direction the rate of change of bearing; variable speed mechanism controlled by said second sliding member and including a disk carried by and shiftable with said sliding member; a driving disk receiving motion from said motor; means receiving motion from said last-mentioned driving disk for effecting rotation of said bearing-dial; and variable speed mechanism interposed between said second-mentioned variable speed mechanism and said bearing-dial and controlled by said second disk-shifting member to cause said dial when once set to the correct bearing to continue to indicate the true bearing at future instants of time.

15. A range-clock of the class specified, including a casing, a range dial graduated in yards of range and mounted at the top of said casing; a bearing-dial graduated in degrees of bearing and also mounted at the top of said casing; a way carried beneath the bearing-dial and rotatable therewith; a block displaceable radially along said way; means for manually effecting movement of said block in the way, and whereby the ship's speed indication is set up in the clock; an axis member carried by said block; a radial way sustained by said axis member; a pin-carrying member displaceable along said radial way; means for effecting a rotative movement of said radial way to set up the target course in said clock; means for radially displacing said pin-carrying block in said radial way; means for setting up an initial bearing; and automatic means for indicating the change of bearing at each instant of time.

16. A range-clock of the class specified for generating the rates of change of range and bearing of a relatively-remote traveling target, including a casing; a range-dial graduated in yards of range and mounted at the top of said casing; a bearing-dial graduated in degrees of bearing and also mounted at the top of said casing; a way carried beneath the bearing-dial and rotatable therewith; a block displaceable radially along said way; means for manually effecting movement of said block in the way, and whereby the ship's speed indication is set up in the clock; an axis member carried by said block; a radial way sustained by said axis member; a pin-carrying member displaceable along said radial way; means for effecting a rotative movement of said radial way to set up in said clock the observing ship's course as imposed on the observed target; means for radially displacing said pin-carrying block in said radial way; a target-course head; a target-speed head; both of said heads being actuated when said block-moving means is operated; means for setting up an initial bearing; and automatic means for indicating the change of bearing at each instant of time.

17. A range-clock of the class specified for generating the rates of change of range and bearing of a relatively-remote traveling target, including a casing; a range-dial graduated in yards of range and mounted at the top of said casing; a bearing-dial graduated in degrees of bearing and also mounted at the top of said casing; a way carried beneath the bearing-dial and rotatable therewith; a block displaceable radially along said way; means for manually effecting movement of said block in the way, and whereby the ship's speed indication is set up in the clock; an axis member carried by said block; a radial way sustained by said axis member; a pin-carrying member displaceable along said radial way; means for effecting a rotative movement of said radial way to set up the target-course in said clock; means for radially displacing said pin-carrying block in said radial way; a target-course head; a target-speed head; both of said heads being actuated when said block-moving means is operated; means for effecting movement of said axis member to produce movement of the ship's speed and course, means for effecting a setting up of the observed target-course, and target-speed instrumentalities, as described, and thereby to effect a definite positioning of said pin, whereby a measure of the rate of change of range and the rate of change of bearing is transmitted to said dials; means for setting up an initial bearing; and automatic means for indicating the change of bearing at each instant of time.

18. A range-clock of the class specified for generating the rates of change of range and bearing of a relatively-remote traveling target, including a casing; a range-dial graduated in yards of range and mounted at the top of said casing; a bearing-dial graduated in degrees of bearing and also mounted at the top of said casing; a way carried beneath the bearing-dial and rotatable therewith; a block displaceable radially along said way; means for manually effecting movement of said block in the way, and whereby the ship's speed indication is set up in the clock; an axis member carried by said block; a radial way sustained by said axis member; a pin-carrying member displaceable along said radial way; means for effecting a rotative movement of said radial way to set up in said clock the observing ship's course as imposed on the observed target; means for radially displacing said pin-carrying block in said radial way; a target-course head; a target-speed head; both of said heads being actuated when said block-moving means is operated; variable speed mechanism; controlling members each slotted to receive said pin and slidable in relation thereto; means whereby the displacement of said pin in the slot of one of said members is transmitted to said range-dial to indicate the change of rate of range; means for setting up an initial bearing; and automatic means for indicating the change of bearing at each instant of time.

19. A range-clock of the class specified for generating the rates of change of range and bearing of a relatively-remote traveling target, including a casing; a range-dial graduated in yards of range and mounted at the top of said casing; a bearing-dial graduated in degrees of bearing and also mounted at the top of said casing; a way carried beneath the bearing-dial and rotatable therewith; a block displaceable radially along said way; means for manually effecting movement of said block in the way, and whereby the ship's speed indication is set up in the clock; an axis member carried by said block; a radial way sustained by said axis member; a pin-carrying member displaceable along said radial way; means for effecting a rotative movement of said radial way to set up in said clock the observing ship's course as imposed on the observed target; means for radially displacing said pin-carrying block in said radial way; a target-course head; a target-speed head; both of said heads being actuated when said block-moving means is operated; variable speed mechanism; controlling members each slotted to receive said pin and slidable in relation thereto; means whereby the displacement of said pin in the slot of one of said members is transmitted to said range-dial to indicate the change of rate of range; means for setting up the bearing on the bearing-dial and causing the dial to rotate at a speed representing the rate of change of bearing including a variable change-speed mechanism comprising a constant-speed disk; a skew-wheel for driving the same, a shaft mechanically connected to said dial and receiving motion therefrom at a speed proportional to the displacement of the pin in the slot in the other of said slotted controlling members; means for setting up an initial bearing; and automatic means for indicating the change of bearing at each instant of time.

In testimony whereof we have hereunto set our hands in presence of two subscribing witnesses.

ARTHUR H. POLLEN.
HAROLD ISHERWOOD.

Witnesses:
FRANCES H. POLLEN,
D'ARCY M. CLARK.